United States Patent Office 3,379,749
Patented Apr. 23, 1968

3,379,749
PREPARATION OF MONOISOCYANATES FROM ISOCYANATE DISTILLATION RESIDUES
Hans-Joachim Hennig, Cologne-Stammheim, and Otto Bayer, Leverkusen, Germany, assignors to Farbenfabriken Bayer Aktiengesellschaft, Leverkusen, Germany, a German corporation
No Drawing. Filed June 1, 1964, Ser. No. 371,795
Claims priority, application Germany, June 5, 1963, F 39,919
7 Claims. (Cl. 260—453)

ABSTRACT OF THE DISCLOSURE

The distillation residue obtained after distilling off the isocyanate formed in the phosgenation of the primary amine is reacted with a monosubstituted or disubstituted urea or a primary amine at a temperature of about 150 to about 300° C. in order to generate the isocyanate which is continuously removed from the reaction mixture.

This invention relates to organic isocyanates and more particularly to the production of isocyanates from inexpensive raw materials.

In the production of organic polyisocyanates such as toluylene diisocyanate, diphenylmethane diisocyanate, naphthylene diisocyanate and the like where the product is refined by distilling it from the byproducts of the process of its manufacture, varying quantities of distillation residues are obtained. It has been known heretofore that these distillation residues contained laten —NCO groups which could be regenerated, for example, by heating them in the presence of alcohols to form plastics. Also, the distillation residues have been used directly as a road surface in admixture with tar. However, such methods of utilization of the distillation residues are unsatisfactory, especially from an economic view point in view of the expensive raw materials such as toluylene diamine and phosgene which go into their preparation.

It is, therefore, an object of this invention to provide an economical way of preparing pure organic isocyanates from the distillation residue obtained when distilling an isocyanate from the byproducts of its manufacture. Another object of this invention is to provide a method of preparing low boiling aliphatic isocyanates. Still another object of this invention is to provide an improved method of utilizing distillation residues and simultaneously preparing low boiling aliphatic monoisocyanates. Still another object of this invention is to provide an economical method of preparing methyl isocyanate.

The foregoing objects and others which will become apparent from the following description are accomplished in accordance with the invention, generally speaking, by providing for the reaction of the distillation residue obtained when distilling the product of phosgenation of a primary amine to form the corresponding isocyanate, with an N,N'-disubstituted urea, a monosubstituted urea or a primary amine with continuous removal of the resulting organic monoisocyanate which is formed, preferably at a temperature of from about 150° C. to about 300° C.

The distillation residues are preferably those obtained in the production of aromatic carbocyclic primary amines including aromatic carbocyclic primary monoamines and meta- and para-aromatic carbocyclic primary diamines which are reacted with phosgene to prepare the corresponding isocyanate and then distilled to remove substantially all of the free isocyanate leaving a distillation residue of uncertain composition, but which is essentially free from free —NCO groups. Depending on the amine used as a starting material and the conditions of the phosgenation process, the high boiling distillation residue which is essentially free from unreacted —NCO groups can amount to as much as 30 percent of the amine introduced. The chemical composition of the high boiling distillation residue is not entirely clear but it is assumed that it has the nature of high molecular weight ureas and polymeric isocyanates which have been polymerized through the —NCO groups. It has been found heretofore that the distillation residue can be converted back to the amine by treating it with lye at an elevated temperature. But this is indeed a step in the wrong direction since the amine must once again be converted into an isocyanate by reaction with phosgene, thereby creating more residue in the subsequent distillation procedure.

In accordance with the present invention, the distillation residue is reacted with an N,N'-disubstituted urea, a monosubstituted urea or a primary monoamine, preferably at a temperature of from about 150 to 300° C. This process yields an organic monoisocyanate which corresponds to the organic radical of the urea or amines and if the resulting organic monoisocyanate is continuously removed from the reaction, a method is provided of disposing of the distillation residue once and for all. The N,N'-disubstituted urea, monosubstituted ureas and primary amines preferably have the following formulas respectively:

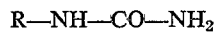

and

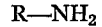

R in the foregoing formula represents a monovalent aliphatic, cycloaliphatic or aromatic radical which preferably yields an organic isocyanate having a low boiling point. Hydrocarbon radicals of the class set forth above are preferred and it is most preferred to have a lower alkyl radical as the radical represented by R in the foregoing formula. The radicals may be the same or different in the N,N'-disubstituted ureas and may be linear, branched, saturated or unsaturated and may contain hereto atoms such as oxygen, nitrogen or sulfur. Preferred radicals include methyl, ethyl and allyl which yield the corresponding readily volatile aliphatic isocyanates.

Any suitable N,N'-disubstituted urea may be used such as for example, N,N'-dimethylurea, N-methyl-N'-cyclohexylurea, N,N'-diethylurea, N-ehyl-N'-butylurea, N,N'-di-n-propylurea, N,N'-diisopropylurea, N,N'-di-n-butylurea, N,N'-di-tert.-butylurea, N,N'-dihexylurea, N,N'-diallylurea, N,N'-di-(3-methoxypropyl)-urea, N,N'-dicyclohexylurea, N,N'-dibenzylurea, N,N'-diphenylurea, N,N'-di-(p-chlorophenyl)-urea and the like.

Any suitable monosubstituted urea may be used such as, for example, methyl urea, ethyl urea, isopropyl urea, tertiary butyl urea, hexyl urea, allyl urea, cyclohexyl urea, benzyl urea, phenyl urea, m-chlorophenyl urea and the like.

Any suitable primary amine may be used such as, for example, methylamine, ethylamine, propylamine, isopropylamine, allylamine, n-butylamine, tertiary-butylamine and isobutylamine, hexylamine, methoxypropylamine, hexahydro-4-aminotoluene, cyclohexyl methylamine, benzylamine, aniline and 3-chloroaniline and the like.

The distillation residues employed in accordance with the invention are sometimes liquid, sometimes rubbery soft and sometimes resin-like, brittle materials which are often only completely soluble when fresh, but are usually only partially soluble even when fresh. The distillation residues become insoluble after aging for a few days.

The distillation residue obtained in the production of any suitable isocyanate may be used including the distillation residue obtained when distilling refined isocyanate from the phosgenation product of 2,4-and 2,6-toluylene diamines to form 2,4-and 2,6- toluylene diisocyanates; naphthylene-1,5-diamine to form naphthylene-1,5- diisocyanate; diphenylmethane - 4,4' - diamine to form diphenylmethane - 4,4'-diisocyanate; hexane - 1,6 - diamine to form hexane - 1,6 - diisocyanate; 1 - methyl - 2,4-diamino cyclohexane and 1-methyl-2,6-diamino cyclohexane to form 1 - methyl - 2,4 - diisocyanato cyclohexane and 1-methyl - 2,6 - diisocyanato - cyclohexane; dicyclohexylmethane - 4,4' - diamino to form dicyclohexylmethane-4,4' - diisocyanate and the like. The regeneratable isocyanate content of the distillation residue fluctuates between about 5 and about 30 percent depending on the thermal conditions at the time of distillation. In the reaction between the distillation residues containing the latent —NCO groups and substituted ureas or primary amines there is probably an addition to form substituted biurets or substituted ureas which are split by heating to temperatures preferably from about 150° to about 300° C. with the liberation of the organic monoisocyanate. The ratio between the distillation residue and the substituted urea or primary amine depends on the latent —NCO content of the residue. In order to produce an optimum yield of monoisocyanate, the ratio is preferably chosen so that only some of the latent —NCO groups are used for the primary addition; for example, one mol of substituted urea or amine for each 2 to 5 latent —NCO groups present in the distillation residue. Furthermore, one should take into account that when the distillation residues containing latent —NCO groups are not completely soluble, not all of the —NCO groups can enter into the reaction. Therefore, it is preferred to use fresh distillation residue as soon as it is free from isocyanate.

It is not possible to set exact temperature conditions. The initial isocyanate addition with the urea and the latent —NCO groups occurs at temperatures of approximately 100° C. and usually below about 100° C. The decomposition of the initial addition product takes place preferably at a temperature of about 150 to about 300° C., most preferably at about 200 to about 270° C. depending on the components used, the amount of isocyanate present and the like. It is preferred to avoid temperatures above about 300° C. since there is a possibility of loss of isocyanate due to side reactions for example by the formation of carbodiimides with simultaneous evolution of carbon dioxide.

The reaction to split out monoisocyanates can be facilitated by suitable measures. For example, removing the monoisocyanate under reduced pressure or by driving it off using inert carrier gas such as nitrogen or carbon dioxide substantially as soon as it is formed. Moreover, it is sometimes desirable to carry the reaction out in the presence of solvents, or suspension agents. In order to facilitate easy mixing of the reactants, the addition of inert solvents is desirable. It is more economical, however, to carry out the reaction without solvents or suspension agents. Therefore, continuous methods of contacting the reactants, for example in heatable extruder are particularly suitable. If solvents or suspension agents are used, it is preferred to employ high boiling inert liquids which do not react with isocyanates for example, o-dichlorobenzene, trichlorobenzene, diphenyl, decalin or halogenated naphthalenes such as 1,5-dichloro naphthalene or the like. It is preferred to use compounds which do not need to be recovered for economic reasons including anthracene residues, o-nitrochlorobenzene, diesel oil or the like.

In order to even further improve the reaction, it is preferred to carry out the process using the reactants in a finely comminuted form. It is also preferred to use the substituted ureas which are mixed with the finely comminuted distillation residue and heated while stirring to a maximum temperature of about 300° C. The resulting organic monoisocyanate will be split off in a matter of a few minutes although in some cases the reaction may take up to several hours. The reaction mixture usually has a pasty, kneadable consistency. If the process is carried out using liquid primary amines, the reaction is much faster and they are converted in the course of the reaction into substituted ureas which in turn yield a readily volatile monoisocyanate.

The monoisocyanates obtained in accordance with the invention are useful as pest control agents, pharmaceutical compounds and for the production of synthetic plastics. They are particularly suitable as insecticides. For example, methyl isocyanate can be used as in U.S. Patents 3,113,908 or 3,099,681.

It was not to be expected that the distillation residue would regenerate the isocyanate instead of reacting with the primary and secondary amino groups of the ureas and amines. It is especially surprising that these materials can be used to produce isocyanates in view of the non-reaction of the latent —NCO groups with hydroxyl groups to produce plastics. It is only when the process of the present invention is followed with the continuous removel of the monoisocyanate as it is formed that the process occurs.

The invention is further illustrated by the following examples in which parts are by weight unless otherwise specified.

Example 1

About 500 parts of a partially soluble distillation residue having the brittleness of resin and an —NCO content of about 22.1%, such as is formed when toluylene diisocyanate is produced on a large industrial scale, is ground to a powder with the fineness of dust, thoroughly mixed with about 44 parts (about ½ mol) of N,N'-dimethylurea and about 800 parts of 1,2,4-trichlorobenzene and heated in a thick-walled reaction vessel, which is equipped with a reflux condenser, and while stirring vigorously, at about 250 to about 270° C. (oil bath temperature) while simultaneously conducting a weak nitrogen stream through it. In the course of about 2½ hours, about 43 grams of distillate are collected in the cooled receiver and the following cold trap. In order to facilitate separation, a vacuum of up to at least about 80 mm. Hg is applied during the last half hour. After distillation, there are obtained about 41 parts by weight (about 72% of the theoretical) of methyl isocyanate (B.P. about 37° C.).

Example 2

In a manner similar to Example 1, 500 parts of distillation residue from the distillation of toluylene diisocyanate with about 22.1% of —NCO and about 800 parts of 1,2,4-trichlorobenzene are mixed with the quantities of N,N'-dialkyl urea indicated in the table, heated and the corresponding monoisocyanate is distilled off.

| N,N'-Dialkylurea | Mol and g. | ° C. | Hours | Monoisocyanate | Yield, Percent |
| --- | --- | --- | --- | --- | --- |
| Diethylurea | 0.5 / 58 | 250 | 3.5 | Ethyl isocyanate | 73.4 |
| Di-n-propylurea | 0.5 / 72 | 250 | 5 | n-Propylisocyanate | 82.5 |
| Diallylurea | 0.5 / 70 | 240–260 | 3 | Allyl isocyanate | 66.5 |

Example 3

About 36.5 parts (about 0.5 mol) of tertiary butylamine are added dropwise at room temperature and with vigorous stirring to a mixture of about 500 parts of distillation residue from the distillation of toluylene diisocyanate and having about 22.1% of —NCO and about 800 parts of o-dichlorobenzene, the corresponding substituted urea being formed with gentle heating. The mixture is heated for about three hours at about 200° C., about 46 parts of distillate separating out. After redistillation, there are obtained about 45 parts (about 91% of the theoretical) of tertiary butyl isocyanate (B.P. about 85° C.).

Example 4

In a manner similar to Example 3, about 500 parts of distillation residue from the distillation of toluylene diisocyanate and with about 22.1% of —NCO and about 800 parts of 1,2,4-trichlorobenzene are mixed with the quantities of primary amines as indicated in the table, heated and the corresponding monoisocyanate is distilled off.

| Amine | Mol and g. | ° C. | Hours | Monoisocyanate | Yield, Percent |
|---|---|---|---|---|---|
| n-Propylamine | 0.5 / 30 | 250 | 2 | n-Propylisocyanate | 59 |
| Allylamine | 1 / 57 | 250 | 2 | Allylisocyanate | 55.6 |
| n-Butylamine | 1 / 73 | 240 | 4 | n-Butylisocyanate | 475 |

Example 5

By heating about 500 parts of distillation residue from the distillation of toluylene diisocyanate and with about 22.1% of —NCO, about 37 parts (about 0.5 mol) of monomethylurea and about 800 parts of 1,2,4-trichlorobenzene for about 3 hours to a maximum temperature of about 240° C. there are obtained about 16 parts of distillate, i.e. about 56.2% of the theoretical quantity of methyl isocyanate.

If the monomethylurea is replaced by about 50 parts (about 0.5 mol) of monoallyl urea, about 32 parts (about 77% of the theoretical) of allyl isocyanate are obtained.

Example 6

Extremely finely-ground distillation residue from the distillation of toluylene diisocyanate and with about 20 to 22 percent of —NCO and N,N'-dimethylurea are thoroughly mixed in the proportions of about 500:44 to about 200 parts and the material, without addition of solvent or suspension agent, is continuously heated to about 200 to 240° C. in a heatable reaction worm, which is additionally equipped with a condenser and coolable receiver. Methyl isocyanate separates out in the receiver, the yield depending upon the selected ratios, the reaction and the residence time.

It is to be understood that the foregoing examples are given for the purpose of illustration and that any other suitable urea, amine, distillation residue or the like could have been used therein provided that the teachings of this disclosure are followed.

Although the invention has been described in considerable detail in the foregoing it is to be understood that such detail is solely for the purpose of illustration and that variations can be made therein by those skilled in the art without departing from the spirit of the invention and the scope of the claims.

What is claimed is:

1. A process for the preparation of monoisocyanates which comprises heating the distillation residue obtained when distilling the product of phosgenation of an aromatic carbocyclic primary amine with a compound having the formula

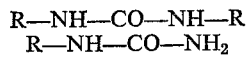

or

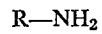

wherein R is a monovalent aliphatic, cycloaliphatic or aromatic radical, at a temperature of from about 150° C. to about 300° C. while continuously removing the resulting aliphatic, cycloaliphatic or armonatic monoisocyanate.

2. The process of claim 1 wherein R is a lower alkyl radical and said monoisocyanate is a lower alkyl monoisocyanate.

3. The process of claim 1 wherein R is methyl and said monoisocyanate is methyl isocyanate.

4. The process of claim 1 wherein said aromatic carbocyclic primary amine is selected from the group consisting of aromatic carbocyclic primary monoamines and meta- and para-aromatic carbocyclic primary diamines.

5. The process of claim 1 wherein said distillation residue is heated with said group member at a temperature of from about 200 to about 270° C.

6. A process for the preparation of lower alkyl monoisocyanates which comprises heating the distillation residue obtained when distilling the product of phosgenation of an aromatic carbocyclic primary amine with an N,N'-di-lower alkyl urea at a temperature of from about 150° C. to about 300° C. while continuously removing the resulting lower alkyl monoisocyanate.

7. The process of claim 6 wherein said lower alkyl radical is a methyl radical.

References Cited

UNITED STATES PATENTS 3,180,852   4/1965   Pfirschke et al. _____ 260—77.5
3,246,035   4/1966   Forman et al. _____ 260—582

OTHER REFERENCES

Wagner: Angewandte Chemie, vol. 74, July–December 1962, pp. 799–801.

CHARLES B. PARKER, *Primary Examiner.*

D. H. TORRENCE, *Assistant Examiner.*